Patented Apr. 14, 1942

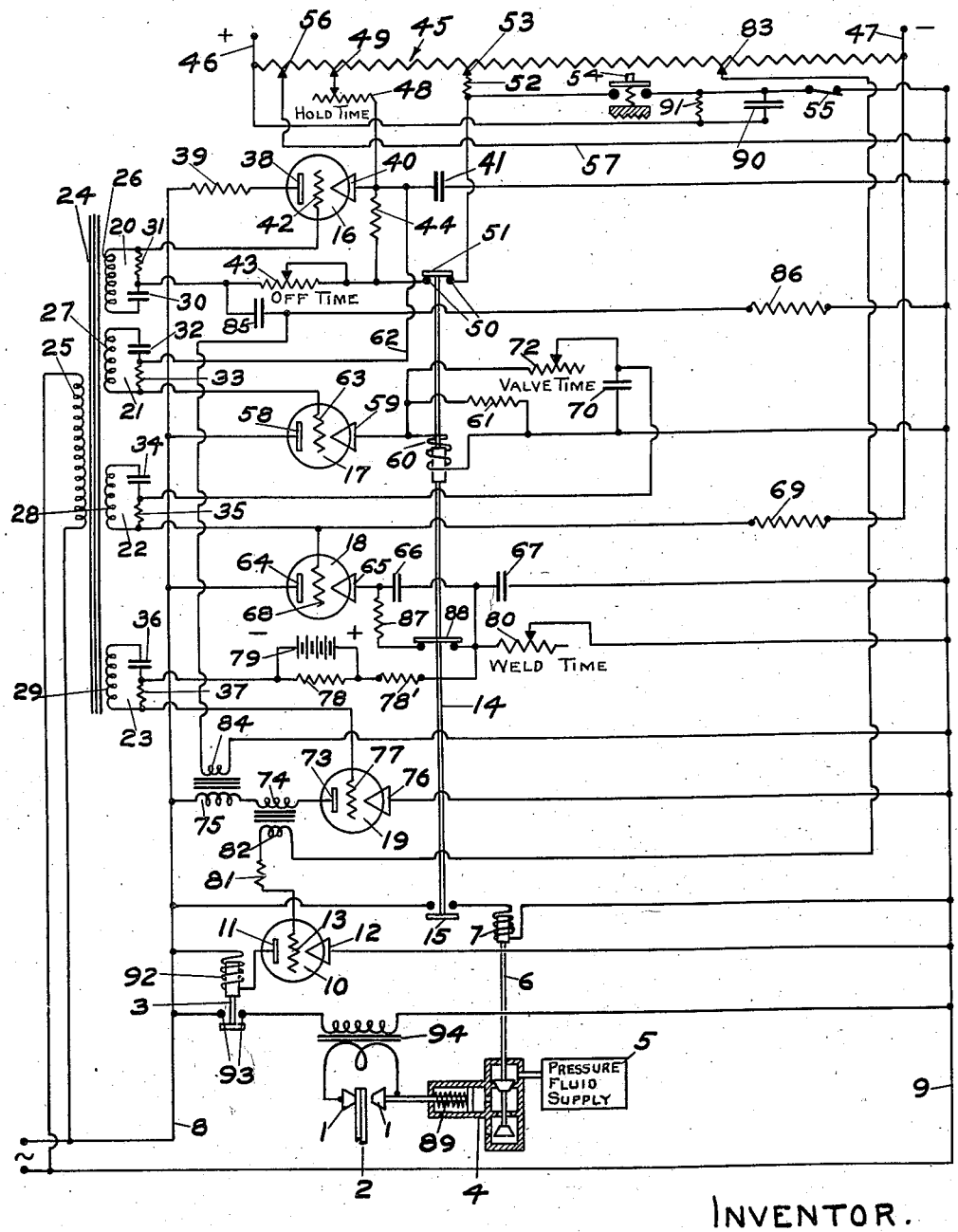

2,279,311

UNITED STATES PATENT OFFICE 2,279,311

ELECTRON TUBE TIMING DEVICE

Fritz A. Gross, Watertown, Mass., assignor to Raytheon Manufacturing Company, Newton, Mass., a corporation of Delaware Application December 19, 1939, Serial No. 310,035

17 Claims. (Cl. 250—27)

This invention relates to an electron tube timing device, and more particularly to such a device which performs a cycle of timing operations in which automatic repetition of such a cycle is afforded. This invention has particular application to resistance welding systems in which such a cycle of timed operations occurs.

An object of this invention is to accomplish such timing operations in a simple and reliable manner.

Another object is to provide for increased accuracy of operation, including the firing of each tube at a predetermined phase angle independently of the adjustments of the timed periods.

A further object is to obtain individual adjustments of the length of each timed period without affecting the length of any other period.

A still further object is to provide an arrangement in which, if desired, only a single sequence of operation may be secured upon the operation of the starting control.

The foregoing and other objects of my invention will be best understood from the following description of one form thereof, reference being had to the accompanying drawing, wherein the figure is a diagrammatic representation of a system embodying my invention.

The system as shown in the drawing is represented as being applied to a resistance welding device consisting of a pair of welding electrodes 1—1, which are adapted to operate upon a resistance welding load 2 consisting of material to be welded. Welding current is supplied to the welding electrodes 1—1 through a transformer 94 controlled by a relay device 3. The electrodes 1—1 are brought into contact with the resistance welding load 2 by means of a pressure gun 4. This pressure gun is operated from a suitable supply of pressure fluid 5. The supply of this pressure fluid to the gun 4 is controlled by a valve 6 operated by a solenoid 7. When the solenoid 7 operates the valve 6, the pressure fluid from 5 is supplied to the gun 4, and the electrodes 1—1 are moved so as to clamp the resistance welding load 2. When the valve 6 is released, the electrodes 1—1 are released from the resistance welding load 2.

The system illustrated is energized from two alternating current lines 8—9 which are connected to a suitable source of alternating current. The welding current is supplied to the electrodes 1—1 from the alternating current lines 8—9 when the relay 3 is operated by its operating coil 92 to close the contacts 93. The operating coil 92 is also energized from the alternating current lines 8 and 9 through a control tube 10. This control tube may be of the gaseous discharge type in which a discharge is initiated by a control electrode. As is usual in this type of tube, it is provided with an anode 11, a cathode 12, and a control electrode or grid 13. The cathode 12 is connected directly to the alternating current line 9, while the anode 11 is connected through the operating coil 92 to the alternating current line 8. The tube 10 starts to conduct current whenever the anode 11 becomes positive, and the grid 13 becomes positive with respect to its cathode 12. When the tube 10 conducts current and the relay 3 is closed, welding current is supplied to the welding electrodes 1—1. When the tube 10 stops conducting current, the relay 3 is deenergized and the supply of welding current is terminated. I have indicated the control 3 as being a mechanical relay in the interest of simplicity. However, in many instances it is desirable to utilize an electronic switch for this control. Such an electronic switch is described and claimed, for example, in the copending application of John W. Dawson, Serial No. 284,502, filed July 14, 1939, Patent No. 2,201,966, dated May 21, 1940.

The solenoid 7 of the valve 6 is controlled by a valve relay 14 whose contact arm 15 in its energized position closes the circuit of the solenoid 7 across the alternating current lines 8 and 9. Thus when relay 14 is operated, the welding electrodes 1—1 clamp the resistance welding load 2, and when the grid 13 becomes positive, the tube 10 fires and causes welding current to be supplied to the welding load.

In order to control the sequence of operations, the system is provided with control tubes 16—19, inclusive. Each of these tubes likewise is of the gas or vapor-filled type in which the initiation of an ionizing discharge therein is controlled by a control electrode, such as a grid interposed between the cathode and anode. In the system to be described, conduction between each cathode and anode may be initiated if the grid is at substantially the same potential as the cathode, or slightly positive with respect thereto. For the purposes of reliable operation and accuracy of control, it is desirable that each of the tubes 16—19, inclusive, shall start conducting current at the beginning of a positive half wave of the alternating voltage applied to the anodes of these respective tubes. In order that this shall occur, a plurality of phase-shift circuits 20—23, inclusive, are provided, the operation of which will be described below. These phase-shift circuits are energized from a transformer 24 having a primary 25 connected to and energized from the alternating current lines 8 and 9. The transformer 24 is provided with a plurality of secondaries 26—29, inclusive. In the phase-shift circuit 20, a condenser 30 and a resistance 31 are connected in series across the secondary winding 26. Likewise in the phase-shift circuits 21, 22 and 23, condensers 32, 34 and 36 are connected in series respectively with resistances 33, 35 and 37, and these series circuits are connected respectively across the secondaries 27, 28 and 29.

The discharge tube 16 is provided with an anode 38 which is connected through a current-limiting resistance 39 to the line 8. This tube is also provided with a cathode 40 connected through a condenser 41 to the line 9. Grid 42 of the tube 16 is connected to the upper end of the resistance 31, the lower end of which is connected through an adjustable resistance 43 and the bleeder resistance 44 to the cathode 40.

In order to supply the system with various biasing potentials, a potentiometer 45 is provided which is connected at its opposite ends by conductors 46 and 47 to the positive and negative terminals of some suitable direct current source. In order to supply a negative bias to the grid 42 so as to normally maintain the tube 16 in a de-energized condition, the upper end of the bleeder resistance 44 is connected through an adjustable resistance 48 to a tap 49 on the potentiometer 45. The lower end of the bleeder resistance 44 is connected through a pair of contacts 50 normally closed by the back contact arm 51 of the relay 14, and then through a resistance 52 to another tap 53 on the potentiometer 45. The tap 53 is located so as to be more negative than the tap 49. Thus a D. C. voltage appears across the bleeder resistance 44 which holds the grid 42 negative with respect to its cathode 40, and therefore the tube 16 normally does not conduct current.

The lower end of the resistance 52 is connected through a normally open control pushbutton switch 54 and through a normally closed repeat switch 55 to the line 9. In order to fire the tube 16, 54 is closed, which connects the grid 42 through the resistances 31, 43, contact arm 51, pushbutton switch 54, switch 55 to line 9. Since the condenser 41 under these conditions has no charge on it, the cathode 40 is substantially at the potential of line 9, and thus the grid 42 is tied to the cathode potential with the superimposed alternating voltage across the resistance 31. The constants of the phase-shift circuit 30—31 are so chosen that the alternating voltage across 31 becomes positive at the beginning of the positive half of the alternating voltage impressed on the anode 38. Due to this voltage, the grid 42 is constrained to become positive at this point, and thus the tube 16 fires at the beginning of the positive half of the alternating voltage applied to its anode. Immediately upon the conduction of current by the tube 16, the condenser 41 charges and acquires a voltage which is used to fire the next tube 17. Tube 16 would cease conducting current if the condenser 41 alone were present in series with said tube. In order for the tube 16 to continue to conduct current, its cathode circuit is completed through the resistance 48 to the tap 49 which is adjacent to another tap 56 on the potentiometer 45, which is somewhat more positive than the tap 49. From the tap 56 a conductor 57 extends to the line 9. Since the cathodes of the tubes 10 and 16 to 19, inclusive, are connected directly to the line 9, the potential of the tap 56 is thus the normal cathode potential of these tubes.

The tube 17 is provided with an anode 58 connected to the line 8 and a cathode 59 connected through the energizing coil 60 of the relay 14 to the line 9. A resistance 61 is preferably connected across the coil 60 in order to prevent chattering of the relay 14. The end of the condenser 41 nearest the cathode 40 which due to the action described above has acquired a positive potential with respect to the line 9, is connected by a conductor 62 to the upper end of the resistance 33, the lower end of which is connected to the control grid 63 of the tube 17. Due to the positive voltage from the condenser 41 supplied to the grid 63, the tube 17 fires at the beginning of the positive half of the alternating voltage applied to the anode 58. This time is determined by the phase-shift circuit 21 in a manner similar to that as described in the phase-shift circuit 20. In the case of the phase-shift circuit 21, however, the firing point is slightly delayed in order to give the condenser 41 sufficient time to charge up to the requisite value. Upon conduction by the tube 17, the coil 16 is energized and the relay 14 picks up. As previously indicated, this energizes valve 6, and therefore the electrodes 1—1 are brought into contact with the welding load 2. Upon operation of the relay 14, the back contact arm 51 opens the contacts 50—50. This removes the D. C. bias from across the resistance 44, and even though the circuit through the pushbutton switch 54 is opened, the bias voltage on the grid 42 is maintained at cathode potential through the resistance 44 and the tube 16 continues to fire each time its anode 38 becomes positive. In this way a momentary action of the pushbutton switch 54 is sufficient to insure the complete cycle of operations of the system.

The tube 18 is provided with an anode 64 connected directly to the line 8. This tube also has a cathode 65 which is connected through condensers 66 and 67 in series to the line 9. The tube 18 has a control grid 68 which is ordinarily held negative by being connected through a resistance 69 to the negative end of the potentiometer 45. The control grid 68 is also connected to the lower end of the resistance 35 of its associated phase-shift circuit 22. The upper end of said resistance 35 is connected through a condenser 70 to the line 9. The condenser 70 is connected across the coil 60 through an adjustable resistance 72. When the tube 17 fires, a D. C. voltage appears across coil 60 and resistance 61, and this is impressed across the circuit of the resistance 72 and condenser 70 in series. The condenser 70 thereupon begins to charge at a rate determined by the setting of the resistance 72. This gradually shifts the bias of grid 68 in the positive direction. After a period of delay determined by the setting of resistance 72, the bias of grid 68 becomes sufficiently positive for the tube 18 to fire at the beginning of the positive half of the alternating voltage applied to the anode 64, as determined by the associated phase-shift circuit 22. This operation is similar to that as described above in connection with the phase-shift circuit 20. The condensers 66 and 67 quickly charge up, and the tube 18 ceases conduction after a very short time. The charge accumulated by the condenser 67 is used to fire the next tube 19. The tube 19 has an anode 73 which is connected through two transformer primaries 74 and 75 to the line 8. The cathode 76 of the tube 19 is connected directly to the line 9. Control grid 77 of the tube 19 is connected to the lower end of the resistance 37 of its associated phase-shift circuit 23. The grid 77 is normally maintained negative due to a bias voltage existing across the resistance 78. This bias is created by a suitable source of direct voltage 79 connected across the resistance 78. This resistance is connected from the top of the resistance 37 through a fixed resistance 78' and an adjustable resistance 80 to the line 9, which completes the circuit between the grid 77 and its associated cathode 76. When the condenser 67 acquires its charge, it opposes the negative bias of the D. C. source 79, and the grid 76 becomes sufficiently positive to fire the tube 19 at the beginning of a positive half of the alternating voltage applied to its anode 73, as determined by the associated phase-shift circuit 23. Here again the action is similar to that described above in connection with the phase-shift circuit 20. As in the case of tube 17, however, the firing point is delayed slightly in order to give condenser 67 a chance to charge up to the requisite potential. Upon the firing of tube 19, current flows through the primary 74 giving an impulse which is used to fire the tube 10.

The grid 13 of the tube 10 is connected through a resistance 81 and a secondary winding 82 associated with the primary winding 74 to a tap 83 on the potentiometer 45 which normally holds the grid 13 negative. Current pulses through the tube 19 and the primary winding 74 which occur at the beginning of each positive half of the voltage cycle applied to the anode 11 swing the grid 13 in a positive direction. This causes the tube 10 to start conduction at the beginning of said positive half cycle. These current pulses which cause the tube 10 to conduct occur throughout the period during which the tube 19 conducts. As previously indicated, current through the tube 10 energizes the welding current control relay 3, and thus welding current is supplied to the electrodes 1—1 throughout this period.

After the condenser 67 has become charged, this charge starts to leak off through the resistance 80 at a rate determined by the setting of said resistance. After a predetermined time interval, the charge on the condenser 67 is so reduced that it no longer is sufficient to oppose the negative bias of the battery 79, and therefore the tube 19 stops conducting current. This also stops tube 10, and terminates the supply of welding current to the electrodes 1—1.

While the tube 10 is still conducting, pulses of current flow through the primary winding 75 which sets up an alternating voltage in the secondary winding 84 associated therewith. One end of the secondary winding 84 is connected directly to the line 9, and the other end is connected through a condenser 85 to the lower end of the resistance 31 of the phase-shift circuit 20. A resistance 86 connects the other end of said condenser 85 to the line 9. By the foregoing connection, the alternating voltage of the secondary 84 is impressed on the circuit of the grid 42. This alternating voltage is so fixed that the grid 42 is carried negative after the tube 16 has fired during any cycle. Said grid 42 is then carried positive just before the anode 38 becomes positive, thus causing the tube 16 to restart. When the tube 10 stops, however, the previous voltage pulse has left grid 42 negative, and no positive pulse occurs to restart the tube 16. Therefore the tube 16 stops with the stoppage of tube 19 and its associated tube 10. The charge on the condenser 41 which was maintained during the conduction of the tube 16 now starts to discharge through the resistance 48 at a rate determined by the setting of said resistance 48. After a predetermined time delay, the left end of the condenser 41 becomes sufficiently less positive and the negative bias, due to the voltage between the taps 49 and 56, predominates in the circuit of grid 63. Thereupon the relay 14 is deenergized, and in turn deenergizes the valve 6. Thereupon the welding contacts 1—1 open, terminating the welding cycle.

Upon the deenergization of the relay 14, the contacts 50—50 are closed by the back contact arm 51. This reapplies the negative voltage across the resistance 44. If the pushbutton switch 54 is open at this time, the tube 16 will not fire as described above for the initial condition of tube 16. If, however, the pushbutton switch 54 is still closed, the tube 16 does not fire due to the negative bias across the condenser 85 which was left therein by the final negative voltage pulse from the secondary winding 84. This negative bias of the condenser 85 is still impressed on the grid 42. However, this charge starts to leak off through a discharge path closed by the back contact 51. This discharge path extends from one side of the condenser 85, through the resistance 43, contacts 50, and back contact arm 51, pushbutton switch 54, switch 55, line 9, and resistance 86, back to the other side of condenser 85. The rate of discharge of this condenser depends upon the setting of the resistance 43. After a predetermined period fixed by the setting of said resistance, the bias across condenser 85 falls to a point where it no longer prevents the tube 16 from firing, and thereupon said tube starts to conduct current. When this happens, the cycle of welding operations is repeated.

If the pushbutton 54 is open at the end of a welding cycle, the condenser 85 will assume the charge as determined by the voltage between the tap 56 and a point intermediate the taps 49 and 53. This makes the left end of condenser 85 negative, and is substantially the negative voltage impressed on the grid 42 by the drop across resistor 44. Thus when the pushbutton 54 is first closed, this charge must leak off through resistance 43 before the tube 16 initially fires. This introduces a small delay in the initiation of the first cycle of operations, but is thereafter not present so that such delay is substantially unobjectionable.

Summarizing the foregoing operations, we see that with the switch 55 closed, when the pushbutton switch 54 is closed, tube 16 fires, and then immediately tube 17 fires and closes the welding electrodes upon the work. After a "valve time," as determined by the setting of resistance 72, tube 18 fires, and then immediately tube 19 fires, supplying current to the welding electrodes through the intermediary of the control tube 9 and relay 3. After a "weld time," as determined by the setting of resistance 80, tube 19 stops, and then immediately tube 16 stops. After a "hold time," as determined by the setting of resistance 48, tube 17 stops, deenergizing the valve 6. Thereupon the welding electrodes are withdrawn from the work, for example by a suitable spring 89. After an "off time," as determined by the setting of resistance 43, tube 16 again fires, and the cycle of operations is repeated as long as the switch 54 remains closed. Opening 54 at any intermediate point of the cycle of operations causes the cycle to be completed, due to the fact that the contact arm 51 relieves 54 of control during each cycle, as pointed out above. Thus opening 54 causes the cycle of operations to be carried through and then stopped.

If it is desired merely to cause a single cycle of operations independently of the length of time, 54 is closed and switch 55 is opened. A condenser 90 is connected from the right-hand contact of switch 54 to the positive terminal 46 of the potentiometer 45. The condenser 90 is provided with a by-pass resistor 91. When 54 is closed, an initial rush of current passes to the condenser 90 through the resistance 52. This causes substantially all of the voltage drop between the positive terminal 46 and the tap 53 to occur across the resistance 52. This gives the grid 42 an initial bias, as determined by the voltage between the tap 49 and the positive terminal of the potentiometer 45. This causes the tube 16 to fire and start one cycle of operations. However, after the initial surge, condenser 90 is charged to the bias voltage so that at the end of the cycle of operations the grid 42 is held negative by the voltage between the terminal 49 and the tap 53 if the pushbutton 54 is still held closed. Thus but one cycle of operations is produced. When, however, the pushbutton 54 is opened, the charge on the condenser 90 is dissipated in the resistance 91.

In the case of repeated operations, due to the depression of the pushbutton switch 54 alone, it is desirable to set the resistance 43 to its minimum position in order to decrease the initial time delay mentioned above to a minimum.

Of course it is to be understood that this invention is not limited to the particular details as described above as many equivalents will suggest themselves to those skilled in the art. For example, the timing arrangement could be applied to systems other than welding systems. The invention is capable of providing any number of independently timed consecutive periods by providing additional pairs of control tubes together with their associated timing elements. Likewise various types of tubes and circuit arrangements could be devised which would incorporate the principles as set forth in the above embodiment. It is accordingly desired that the appended claims be given a broad interpretation commensurate with the scope of the invention within the art.

What is claimed is:

1. In combination, a plurality of rectifying electrical space discharge devices in each of which conduction is initiated by a control element, means for impressing alternating voltages on each of said discharge devices, means responsive to the starting of conduction in one of said discharge devices for starting conduction in a second of said discharge devices, time delay means responsive to the conduction in said second discharge device for starting conduction in a third of said discharge devices after a predetermined time delay following the start of conduction in said second discharge device, means responsive to the starting of conduction in said third discharge device for starting conduction in a fourth of said discharge devices and for stopping conduction in said fourth discharge device after a predetermined period of delay, and means responsive to the stopping of conduction in said fourth discharge device for stopping conduction in said first discharge device.

2. In combination, a plurality of rectifying electrical space discharge devices in each of which conduction is initiated by a control element, means for impressing alternating voltages on each of said discharge devices, means responsive to the starting of conduction in one of said discharge devices for starting conduction in a second of said discharge devices, time delay means responsive to the conduction in said second discharge device for starting conduction in a third of said discharge devices after a predetermined time delay following the start of conduction in said second discharge device, means responsive to the starting of conduction in said third discharge device for starting conduction in a fourth of said discharge devices and for stopping conduction in said fourth discharge device after a predetermined period of delay, means responsive to the stopping of conduction in said fourth discharge device for stopping conduction in said first discharge device, and time delay means for stopping conduction in said second discharge device after a predetermined period of delay following the stopping of conduction in said first discharge device.

3. In combination, a plurality of rectifying electrical space discharge devices in each of which conduction is initiated by a control element, means for impressing alternating voltages on each of said discharge devices, means responsive to the starting of conduction in one of said discharge devices for starting conduction in a second of said discharge devices, time delay means responsive to the conduction in said second discharge device for starting conduction in a third of said discharge devices after a predetermined time delay following the start of conduction in said second discharge device, means responsive to the starting of conduction in said third discharge device for starting conduction in a fourth of said discharge devices and for stopping conduction in said fourth discharge device after a predetermined period of delay, means responsive to the stopping of conduction in said fourth discharge device for stopping conduction in said first discharge device, time delay means for stopping conduction in said second discharge device after a predetermined period of delay following the stopping of conduction in said first discharge device, and means responsive to the stopping of conduction in said second discharge device for restarting conduction in said first discharge device after a predetermined period of delay.

4. In combination, a plurality of rectifying electrical space discharge devices in each of which conduction is initiated by a control element, means for impressing alternating voltages on each of said discharge devices, means responsive to the starting of conduction in one of said discharge devices for starting conduction in a second of said discharge devices, time delay means responsive to the conduction in said second discharge device for starting conduction in a third of said discharge devices after a predetermined time delay following the start of conduction in said second discharge device, means responsive to the starting of conduction in said third discharge device for starting conduction in a fourth of said discharge devices and for stopping conduction in said fourth discharge device after a predetermined period of delay, means responsive to the stopping of conduction in said fourth discharge device for stopping conduction in said first discharge device, time delay means for stopping conduction in said second discharge device after a predetermined period of delay following the stopping of conduction in said first discharge device, means responsive to the stopping of conduction in said second discharge device for restarting conduction in said first discharge device after a predetermined period of delay, means to be controlled actuated in response to conduction through said second tube, and means to be controlled actuated in response to conduction through said fourth discharge tube.

5. In combination, a plurality of rectifying electrical space discharge devices in each of which conduction is initiated by a control element, means for impressing alternating voltages on each of said discharge devices, means responsive to the starting of conduction in one of said discharge devices for starting conduction in a second of said discharge devices, time delay means responsive to the conduction in said second discharge device for starting conduction in a third of said discharge devices after a predetermined time delay following the start of conduction in said second discharge device, means responsive to the starting of conduction in said third discharge device for starting conduction in a fourth of said discharge devices and for stopping conduction in said fourth discharge device after a predetermined period of delay, means responsive to the stopping of conduction in said fourth discharge device for stopping conduction in said first discharge device, time delay means for stopping conduction in said second discharge device after a predetermined period of delay following the stopping of conduction in said first discharge device, means responsive to the stopping of conduction in said second discharge device for restarting conduction in said first discharge device after a predetermined period of delay, said last-named means comprising an electromagnetic relay energized by the flowing of current through said second discharge device and a time delay circuit whose operation is initiated and maintained by said relay in its deenergized position.

6. In combination, a plurality of rectifying electrical space discharge devices in each of which conduction is initiated by a control element, means for impressing alternating voltages on each of said discharge devices, two condensers in series with one of said discharge devices, means for starting conduction through said last-named discharge device, whereby said condensers acquire a charge and cause said discharge device to be extinguished, means responsive to the charge across one of said condensers for causing a second of said discharge devices to conduct current, means for discharging said last-named condenser at a predetermined rate whereby said second discharge device stops conduction after a predetermined time delay, and means responsive to the stopping of conduction in said second discharge device for discharging the other of said condensers.

7. In combination, a plurality of rectifying electrical space discharge devices in each of which conduction is initiated by a voltage of a predetermined polarity impressed on a control element, means for impressing alternating voltages on each of said discharge devices, and means responsive to a starting voltage applied to the control element of one of said discharge devices for creating a chain of voltage impulses supplied to successive control elements of successive discharge devices for producing successive starting of said discharge devices, each of said control elements having associated therewith means for superimposing on said voltage impulses an alternating voltage displaced by a predetermined phase angle with respect to the alternating voltage impressed on its discharge device so that, upon the application of a starting voltage to said control electrode, conduction through its discharge device starts at a predetermined fixed point on said last-named alternating voltage.

8. In combination, a plurality of rectifying electrical space discharge devices in each of which conduction is initiated by a voltage of a predetermined polarity impressed on a control element, means for impressing alternating voltages on each of said discharge devices, and means responsive to a starting voltage applied to the control element of one of said discharge devices for creating a chain of voltage impulses supplied to successive control elements of successive discharge devices for producing successive starting of said discharge devices, each of said control elements having associated therewith means for superimposing on said voltage impulses an alternating voltage displaced by a predetermined phase angle with respect to the alternating voltage impressed on its discharge device so that, upon the application of a starting voltage to said control electrode, conduction through its discharge device starts at substantially the beginning of the conducting half of said last-named alternating voltage.

9. In combination, a plurality of rectifying electrical space discharge devices in each of which conduction is initiated by a voltage of a predetermined polarity impressed on a control element, means for impressing alternating voltages on each of said discharge devices, means responsive to a starting voltage applied to the control element of one of said discharge devices for creating a chain of voltage impulses supplied to successive control elements of successive discharge devices for producing successive starting of said disharge devices, and adjustable time delay means for introducing adjustable time delay periods between the starting of successive discharge devices, each of said control elements having associated therewith means for superimposing on said voltage impulses an alternating voltage displaced by a predetermined phase angle with respect to the alternating voltage impressed on its discharge device so that, upon the application of a starting voltage to said control electrode, conduction through its discharge device starts at a predetermined fixed point on said last-named alternating voltage.

10. In combination, a plurality of rectifying electrical space discharge devices in each of which conduction is initiated by a voltage of a predetermined polarity impressed on a control element, means for impressing alternating voltages on each of said discharge devices, means responsive to a starting voltage applied to the control element of one of said discharge devices for creating a chain of voltage impulses supplied to successive control elements of successive discharge devices for producing successive starting of said discharge devices, and adjustable time delay means for introducing adjustable time delay periods between the starting of successive discharge devices, each of said control elements having associated therewith means for superimposing on said voltage impulses an alternating voltage displaced by a predetermined phase angle with respect to the alternating voltage impressed on its discharge device so that, upon the application of a starting voltage to said control electrode, conduction through its discharge device starts at substantially the beginning of the conducting half of said last-named alternating voltage.

11. In combination, a plurality of rectifying electrical space discharge devices each having a pair of main electrodes and a control element and in each of which conduction is initated between said main electrodes by a voltage of a predetermined polarity impressed on said control element, means for impressing alternating voltages on each of said discharge devices, means for applying a substantially continuing starting voltage to the control element of the first of said discharge devices for causing said discharge device to conduct current, means responsive to the starting of conduction in said first discharge device for creating a chain of voltage impulses supplied to successive control elements of successive discharge devices for producing successive starting of said discharge devices, means relating the last of said discharge devices to said first discharge device for applying a stopping potential to the control element of said first discharge device for a predetermined period only, whereupon said first-named starting voltage again starts said first discharge device, and alternative means for applying a transient starting voltage to the control element of said first discharge device, whereby but a single cycle of operations is produced.

12. In combination, a plurality of rectifying electrical space discharge devices in each of which conduction is initiated by a voltage of a predetermined polarity impressed on a control element, means for impressing alternating voltages on each of said discharge devices, a condenser, starting control means for connecting said condenser to a source of direct current, means responsive to the flow of charging current to said condenser for applying a starting voltage to the control element of the first of said discharge devices for causing said discharge device to conduct current, means responsive to conduction of current through said first discharge device for maintaining a starting voltage on its associated control element, means responsive to the starting of conduction in said first discharge device for creating a chain of voltage impulses supplied to successive control elements of successive discharge devices for producing successive starting of said discharge devices, and means relating the last of said discharge devices to said first discharge device for applying a stopping potential to the control element of said first discharge device.

13. In combination, a plurality of rectifying electrical space discharge devices in each of which conduction is initiated by a voltage of a predetermined polarity impressed on a control element, means for impressing alternating voltages on each of said discharge devices, a condenser, starting control means for connecting said condenser to a source of direct current, means responsive to the flow of charging current to said condenser for applying a starting voltage to the control element of the first of said discharge devices for causing said discharge device to conduct current, means responsive to conduction of current through said first discharge device for maintaining a starting voltage on its associated control element, means responsive to the starting of conduction in said first discharge device for creating a chain of voltage impulses supplied to successive control elements of successive discharge devices for producing successive starting of said discharge devices, and means relating the last of said discharge devices to said first discharge device for applying a stopping potential to the control element of said first discharge device, whereby a single cycle of operations is produced for each operation of said starting control means.

14. In combination, a series of electrical space discharge devices of the controlled ignition type, means for impressing a voltage on each of said discharge devices, means responsive to the starting of conduction in the first of said discharge devices for creating a chain of impulses for producing successive starting of the rest of said discharge devices, means for stopping conduction in the last of said discharge devices at a predetermined time after the start of conduction therein, and means responsive to the stopping of conduction in said last discharge device for stopping conduction in said first discharge device.

15. In combination, a series of electrical space discharge devices of the controlled ignition type, means for impressing a voltage on each of said discharge devices, means responsive to the starting of conduction in the first of said discharge devices for creating a chain of impulses for producing successive starting of the rest of said discharge devices, means for stopping conduction in the last of said discharge devices at a predetermined time after the start of conduction therein, means responsive to the stopping of conduction in said last discharge device for stopping conduction in said first discharge device, and means responsive to the stopping of conduction in said first discharge device for causing stopping of conduction in each of the rest of said discharge devices.

16. In combination, a series of electrical space discharge devices of the controlled ignition type, means for impressing a voltage on each of said discharge devices, means responsive to the starting of conduction in the first of said discharge devices for creating a chain of impulses for producing successive starting of the rest of said discharge devices, means for stopping conduction in the last of said discharge devices at a predetermined time after the start of conduction therein, means responsive to the stopping of conduction in said last discharge device for stopping conduction in said first discharge device, means responsive to the stopping of conduction in said first discharge device for causing stopping of conduction in each of the rest of said discharge devices, and means responsive to the stopping of conduction in an intermediate discharge device for restarting conduction in said first discharge device.

17. In combination, a series of electrical space discharge devices of the controlled ignition type each having a pair of main electrodes and a discharge igniting element, means for impressing a voltage on each of said discharge devices, means for causing a substantially continuing conduction in the first of said discharge devices, means responsive to the starting of conduction in said first discharge device for creating a chain of impulses for producing successive starting of the rest of said discharge devices, means responsive to operation of the last of said discharge devices for applying a conduction-stopping impulse to said first discharge device for a limited period, whereupon said means for causing conduction in said first discharge device restarts the cycle of operations, and alternative means to said last-named means for applying a transient starting impulse to said first discharge device, whereby a single cycle of operations is produced.

FRITZ A. GROSS